Figure 1:
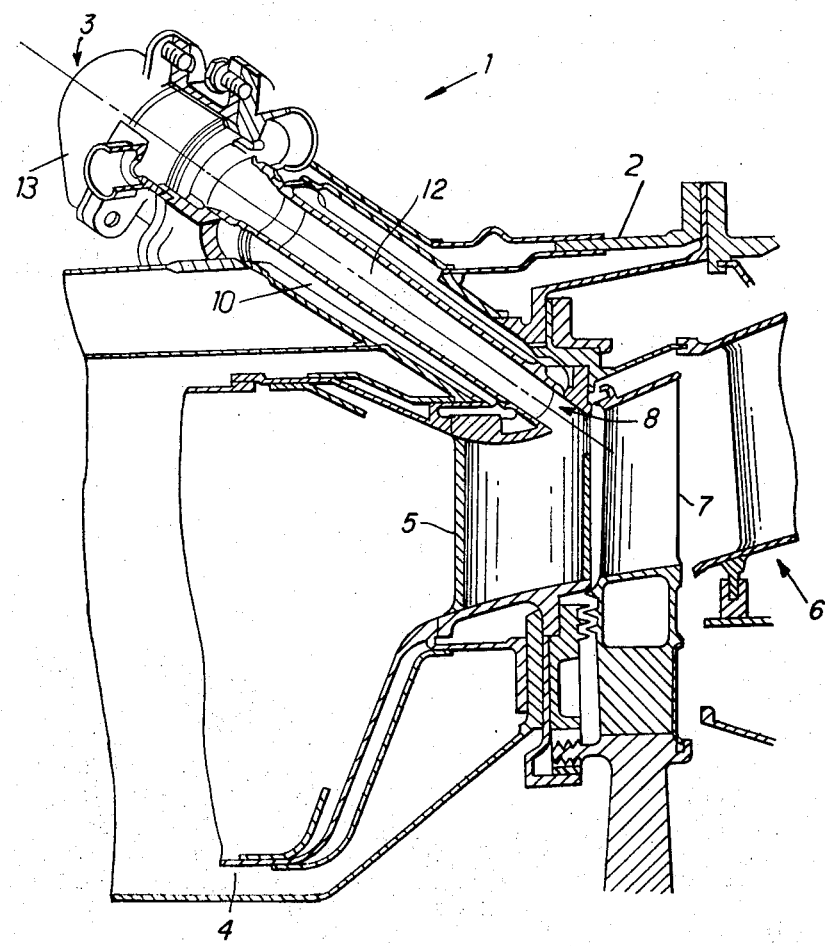

United States Patent [19]
Douglas

[11] 3,855,864
[45] Dec. 24, 1974

[54] RADIATION PYROMETERS
[75] Inventor: Joseph Douglas, Derby, England
[73] Assignee: Rolls-Royce (1971) Limited, London, England
[22] Filed: July 2, 1973
[21] Appl. No.: 375,933

[30] Foreign Application Priority Data
July 6, 1972 Great Britain.................... 31585/72

[52] U.S. Cl.................. 73/355 R, 73/346, 73/351, 250/338, 317/247, 317/262 F
[51] Int. Cl......... G01j 5/34, H01g 7/02, H01g 7/04
[58] Field of Search... 73/346, 351, 355 R, 355 EM, 73/362 CP; 317/262 F, 247; 250/338

[56] References Cited
UNITED STATES PATENTS
| | | | |
|---|---|---|---|
| 3,448,348 | 6/1969 | Stadler | 317/262 X |
| 3,584,509 | 6/1971 | Compton et al. | 73/355 X |
| 3,623,368 | 11/1971 | Decker | 73/355 X |
| 3,657,644 | 4/1972 | Beam et al. | 73/355 X |
| 3,675,017 | 7/1972 | Doyle | 250/338 X |

OTHER PUBLICATIONS
Cooper, J., A Fast–Response Pyroelectric Thermal Detector, in Jour. Sci. Instrum., 1962, Vol. 39, pp. 467-471, Q-184-J7.

Primary Examiner—Richard C. Queisser
Assistant Examiner—Frederick Shoon
Attorney, Agent, or Firm—Cushman, Darby & Cushman

[57] ABSTRACT

A radiation pyrometer which measures the temperature of an object, or an area thereof, passing through its field of view at a high velocity. In the case of an object which passes through the field of view repeatedly (e.g., an object which rotates about an axis which is fixed in relation to the pyrometer) means are provided whereby a temperature profile of the object can be obtained by successively measuring the temperatures of adjacent areas on the object during successive revolutions.

12 Claims, 5 Drawing Figures

RADIATION PYROMETERS

This invention relates to radiation pyrometers, and in particular to radiation pyrometers adapted to measure the intensity of electromagnetic radiation emanating from an object, or one or more portions thereof, as the object passes a point of observation.

In British patent specification number 972,394, there is described and claimed a gas turbine engine in which radiation from a rotatable part of the engine is directed into a radiation pyrometer as the part passes the pyrometer, and in which said pyrometer is adapted to actuate means for indicating the temperature of the rotatable part and/or is adapted to control means controlling the operation of the engine. The rotatable part is preferably a turbine blade.

As is made clear in the abovementioned specification, the radiation-sensitive cell of the prior invention produces an output which is a function of the average temperature of all the turbine rotor blades which pass through the field of view of said cell. However, in recent years the quest for ever high combustion gas temperatures and the widespread use of cooled turbine blades has made it desirable to be able to measure the temperature profiles of the blades from their leading to their trailing edges under operating conditions (i.e., while the engine is on the test bed or in flight), and in order to do this it is necessary to measure the temperature profile of an individual blade as it passes the observation point at a speed of perhaps 1,500ft/sec. It is not possible to perform such a measurement using the apparatus disclosed in British patent specification number 972,394 because of its slow response to a stimulus and its unsophisticated mode of operation, and it is therefore an object of the present invention to provide a method and apparatus whereby such measurements can be performed, although the invention is not so limited.

The invention of British patent specification 972,394 uses a photo-voltaic cell as the radiation-sensitive element of the pyrometer, but in recent years it has become known to use photo-diodes in pyrometers. Photo-diodes have much faster reaction times and higher sensitivities than photo-voltaic cells and are therefore suitable for use in our invention.

One known method of using a photodiode to detect the presence of a source of radiation, to measure its intensity, or to measure variations in its intensity, is to supply the photodiode with voltage pulses delivered at a constant frequency, constant amplitude and in reverse bias. Since a photodiode may be regarded as a capacitor connected in parallel with a photo-current generator, than after each pulse the charge $q$ on the capacitor is given by $q = CV$. where C is the capacitance, and V is applied voltage.

If after each charging pulse the diode is electrically isolated and radiation of appropriate wavelength if allowed to impinge on the photo-sensitive surface, the charge on the diode will decrease due to the photocurrent, and hence the potential difference across the diode will decay.

According to the above equation, the rate of decrease of the charge is given by $$dq/dt = C\, dV/dt$$

which can be expressed as $$i = C\, dV/dt,$$

where $i$ is the photocurrent, i.e., the current which is acting to neutralise the charge on the diode. Since the photo current $i$ is proportional to the intensity $I$ of the incident energy $I = K\, dV/dt$, where $K$ is a constant that contains the capacitance, sensitivity figures and the like.

The relationship between the energy radiated from an object and its temperature is of course given by Planck's Radiation Law.

It will be evident from the above that if radiation of a selected wavelength is falling on the diode while the regular voltage pulses are being applied, the potential difference across the diode will be a sawtooth waveform with respect to time, the amplitude of which will be proportional to the intensity of the radiation, and hence, for any particular wavelength, also a measure of the temperature of the object.

Obviously, for any given series of charging pulses of constant period and amplitude, there will be a maximum amplitude of the saw-tooth potential difference as seen across the output terminals of the diode. This maximum amplitude will be reached when the intensity of the incoming radiation is just sufficient to neutralise the charge on the diode before the next charging pulse is applied. If the radiation intensity then increases any further, there will be no increase in amplitude unless the initial charge on the diode is also increased.

It will be seen that the above described known method of using a photodiode to measure the intensity of radiation emanating from an object, and hence of measuring the temperature of the object, would not be applicable to the task of monitoring the temperature profiles of rotating gas turbine blades for at least the following reasons:

there is no provision for varying the frequency of diode charging pulses according to variations in engine speed;

measuring the amplitude of the diode output potential waveform would merely give an indication of the average temperature of the blades passing through the field of view of the diode during its period of active detection; there is in any case no provision for measuring radiation intensities which are greater than a certain maximum value, which is predetermined by the amplitude of the charging pulse and the charging overload limits of the diode.

It is therefore an object of our invention to provide a method and apparatus whereby the above difficulties may be avoided or reduced.

According to the present invention a radiation pyrometer adapted to produce an output signal which is proportional to the intensity of incident radiation comprises radiation detector means, detector charging means and detector potential differentiating means, said charging means being adapted to charge said detector means to a predetermined electrical potential, said detector means being adapted to produce, upon receipt of said radiation, an electromotive force acting in opposition to said potential, and said differentiating means being adapted to produce a difference signal substantially proportional to the rate of change of said detector potential with respect to time, said difference signal also being the aforementioned output signal.

Preferably the detector charging means charges the detector means at regular time intervals whereby a series of signals is obtained from the detector means in a period of time.

The source of radiation may be a rotor and preferably the detector charging means charges the detector means once per revolution of the rotor whereby the radiation emanating from a portion of the rotor is detected once per revolution of the rotor.

Preferably the detector charging means comprises means for producing a shaped electrical trigger pulse which is fed to a pulse generator which is adapted to produce a charging pulse for the detector means after reception of the shaped trigger pulse.

Preferably there is provided a variable delay circuit whereby the detector means can be charged at any point in a revolution of the rotor whereby the radiation therefrom can be detected.

There is preferably provided at least one delay circuit and at least one detector output sampler, the or each delay circuit being adapted to connect the detector means output to the or each sampler at a predetermined time after the detector means has received a charging pulse.

Preferably there are two delay circuits and two detector output samplers, each sampler being connected to the detector means at different time intervals after the detector means has received a charging pulse.

The output signals from the samplers are preferably fed to a difference amplifier which is adapted to produce an output signal proportional to the difference between the sampler output signals.

The output signal from the difference amplifier may be fed to an oscilloscope whereby a temperature profile of the portion of the rotor is displayed, alternatively the output signal may be fed to recording means such as a pen recorder.

Alternatively or additionally the output signal may be fed to alarm means or temperature control means of the rotor operative if the output signal exceeds a predetermined value.

Preferably the rotor is a rotor of a gas turbine engine and the portion of the rotor comprises a turbine blade mounted on the turbine rotor.

In another aspect, our invention provides a method of measuring the intensity of electromagnetic radiation falling on radiation detector means, said detector means being adapted to produce an electromotive force when stimulated by incident radiation, said method comprising charging said detector means to a predetermined electrical potential in a sense opposite to that of the said electromotive force.

producing a signal substantially proportional to the rate of decrease of said potential with incident radiation, and hence substantially proportional to the intensity of said radiation, and utilising said signal as a measure of said intensity.

The invention also comprises a gas turbine engine having a radiation pyrometer as set forth above.

Having obtained a signal which is a measure of radiation intensity, it is then possible to apply Planck's Radiation Law to discover the temperature of the object from which said radiation is being omitted.

It will be apparent that the present invention is not only applicable to monitoring the temperature of gas turbine blades, but it is also suitable for the measurement of the temperatures of other objects, for example, those undergoing operations on production lines and those undergoing heat treatment processes.

Figure 2:
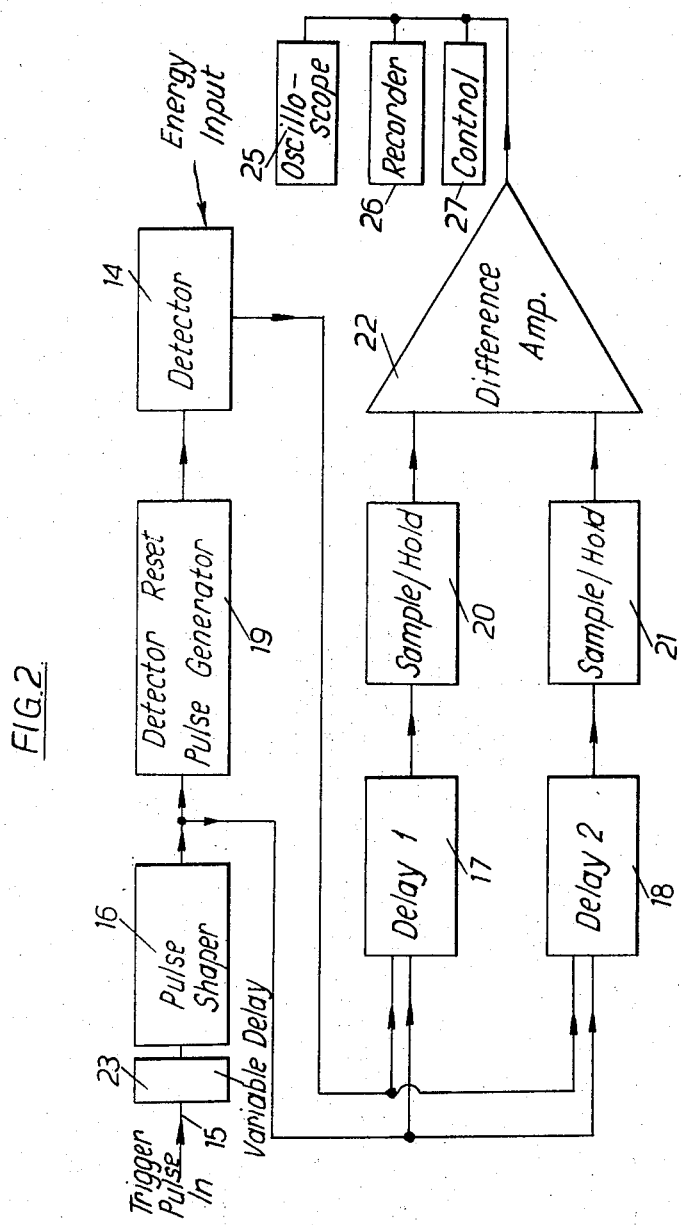
Figure 3A:
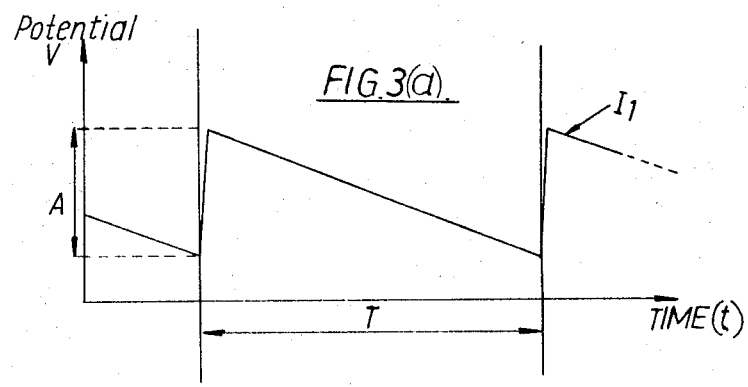
Figure 3B:
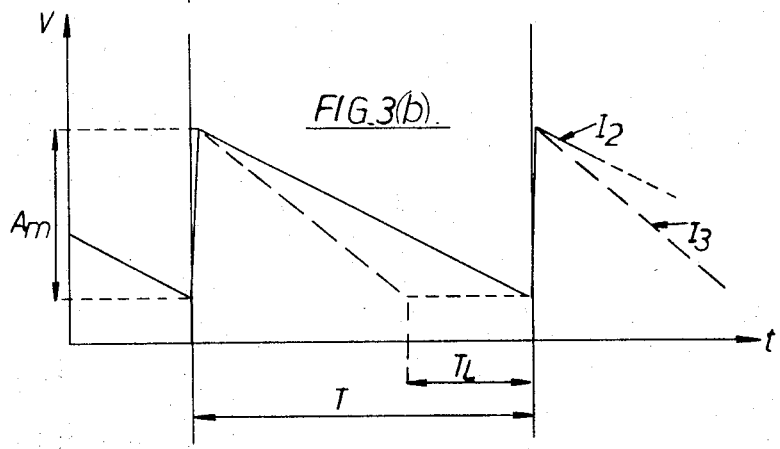
Figure 3C:
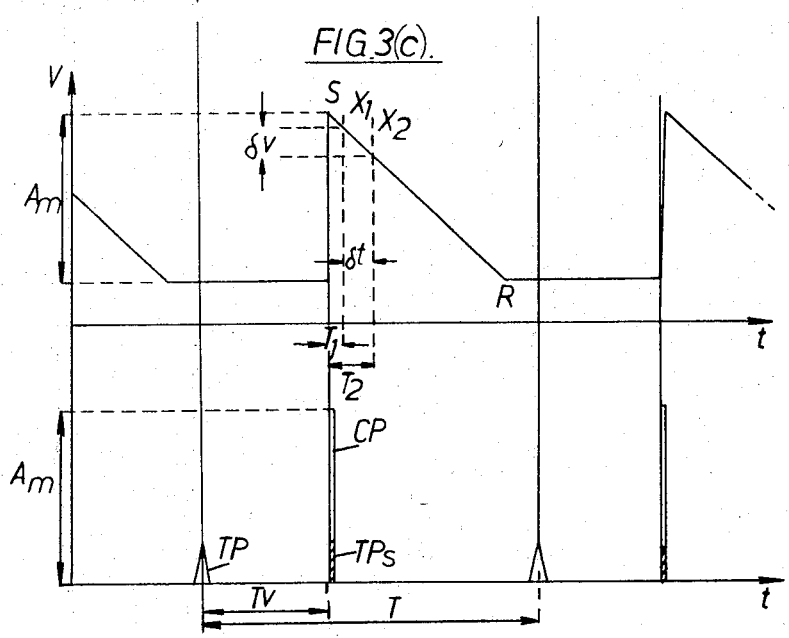

Other aspects of the invention will become apparent from the following description of an embodiment of the invention with reference to the accompanying drawings, in which FIG. 1 shows how a radiation pyrometer may be located in a gas turbine engine, FIG. 2 is a block diagram showing how a suitable photodiode may be incorporated into a system in a manner suitable for performing the invention and FIGS. 3 (a) (b) (c) are graphical representations of the state of charge of a photodiode with respect to time under various conditions.

Referring to FIG. 1, reference numeral 1 indicates in a general manner a broken-away section view of part of a gas turbine engine fitted with a radiation pyrometer, generally designed at 3, incorporating the present invention. Mounted in flow series within engine casing 2 are a compressor (not shown), combustion equipment including flame tube 4, and a multi-stage turbine 6, fitted with first-stage turbine blades 7.

The blades 7 receive the hot combustion gases from nozzle guide-vanes 5.

One of the nozzle guide vanes 5 has a hole 8 therethrough and incorporates a lens-tube 10 which passes out through the engine casing 2. The purpose of the lens-tube 10 is to direct radiation onto a photo-diode or other suitable light-sensitive element situated within the housing 13 of the pyrometer 3 at the remote end of the lens-tube 10.

Further details of the construction of the body, housings and optical system for a pyrometer of similar design in these respects to that shown in the present case, and of its incorporation into a gas turbine engine, are given in the specification of British Patent 972,394, which is incorporated herein by reference though it will be realised that such considerations are a matter of design choice.

The lens-tube 10, whose bore is preferably matt-black, is so mounted that, when turbine blades 7 are rotating, their most highly stressed and heated parts successively pass through the optical axis 12 of the lens tube 10, and hence pass through the field of view of the photodiode Detector 14, which is shown in FIG. 2 as an element in a system diagram designed according to the present invention.

In FIG. 2, in which each element is known per se, the system comprises means (not shown) for producing a regular "trigger" pulse of electrical energy at least once per revolution of the turbine rotor. The frequency of this pulse thus depends upon the angular velocity of the turbine. The pulse is fed at 15 into a variable delay circuit 23 and a Pulse-Shaper circuit 16 which modifies the trigger pulse to produce a sharply defined "square" pulse suitable for operating the subsequent elements of the system.

The shaped trigger pulse is passed simultaneously to first and second Delay Circuits 17 and 18 respectively and to a Pulse Generator 19 which produces the charging pulse for the Detector 14 after reception of the shaped trigger pulse.

By using the Variable Delay Circuit 23 to delay the emission of the shaped trigger pulse (and hence the production of the corresponding charging pulse by the Pulse Generator), it is possible to charge the Detector 14 at any point in a revolution of the turbine i.e., the charging of the Detector can be delayed so that access may be had to any part of the revolution, and to any particular blade, without the blades which have previously passed through the field of view during that revolution affecting the voltage levels seen by Detector output potential Samplers 20 and 21.

Delay circuits 17 and 18 receive the trigger pulse as previously mentioned, and are also connected across the Detector potential output terminals. Delay Circuit 17 is adapted to connect the Detector output Sampler 20 across Detector 14 for a very short period after a certain fixed time (say $T_1$) has elapsed since reception of the shaped trigger pulse. Delay Circuit 18 is likewise adapted to connect Sampler 21 across Detector 14 after a certain fixed time $T_2$ has passed ($T_2 > T_1$) subsequent to reception of the shaped trigger pulse.

The object of taking two samples of the output potential of Detector 14 at times $T_1$ and $T_2$ respectively is to determine the rate of decrease of charge of the Detector with incident radiation and hence a measure of the temperature of the object being investigated, as hereinbefore discussed.

To enable this operation to be performed, Samplers 21 and 22 incorporate means whereby the potential voltage as measured across Detector 14 is "held" i.e., the Samplers contain circuitry whereby the output from the Samplers is held at a constant level indicative of the potential voltage across the Detector at the time the Sampler was in circuit with it. The outputs of Samplers 20 and 21 may be held in this way until the Samplers are again connected to Detector 14.

Difference Amplifier 22 is connected to receive the outputs of Samplers 20, 21 and is adapted to produce an output signal which is proportional to the difference between the levels of the Sampler outputs. The output of Difference Amplifier 22 will thus be proportional to the energy received by the Detector 14 in a time $T_2 - T_1$, and as $T_2 - T_1$ is always constant, it follows that the output of the Difference Amplifier 22 will also be proportional to the intensity of the energy radiated by the object under investigation, and hence will provide a measure of the temperature of the object.

In FIG. 3 are shown graphs relating to the operational sequence of Detector 14.

As previously described, Detector 14 can be regarded as a capacitor connected in parallel with a photo-current generator. Assuming incident radiation of intensity I, and recharging of the Detector at regular intervals, the voltage across the Detector output will be sawtooth waveform such as illustrated in FIG. 3 (a), having a period of T equal to the time for one engine revolution and an amplitude of A volts equal to the total discharge of potential caused by the impinging radiation. As previously explained, if the radiation intensity were then to increase beyond a certain limit, there would be no increase in amplitude unless the initial charge on the Detector were also to be increased. This state of affairs is illustrated in FIG. 3 (b), where charging pulse amplitude and period remain the same as in FIG. 3 (a), and a maximum sawtooth amplitude $A_m$ volts is reached when the intensity of the impinging radiation has increased to a value $I_2$. Any further increase in intensity to intensity $I_3$ will result in a sawtooth waveform whose amplitude remains at $A_m$ but which has a "lost" time $T_L$ in each period T during which there is no means of ascertaining from the output potential of the diode any fluctuations in radiation intensity. The obvious consequence is that, in the case of the measurement of temperatures of turbine blades by the above method, examination of those blades passing the observation point during time $T_L$ is not possible.

According to our invention this problem is surmounted as shown in FIG. 3 (c) by delaying the Detector charging pulse CP for a variable time $T_v$ measured from receipt of the trigger pulse TP by the Variable Delay Circuit 23. Thus, the detector potential sample points $X_1$, $X_2$, though fixed in relation to shaped Trigger Pulse $TP_s$ and Charging Pulse $CP_1$, may be scanned over the whole rotor by delaying the charging of the Detector. The Samplers 20, 21 are used to measure the Detector output potential at times $T_1$ and $T_2$ after receipt of delayed shaped trigger pulse $TP_s$ by Delay Circuits 17, 18 and it will be evident that $T_1$ may be fixed at a value which is equal to or greater than zero, and that $T_2$ will always be greater than zero. Detector potential is thus measured at fixed points $X_1$ and $X_2$ on slope SR, and in the time $T_2 - T_1$ (i.e., $\delta t$) the potential declines by $\delta v$. Hence, the rate of decrease of potential due to impingement of radiation on Detector 14 is $\delta v/\delta t$. In fact, it is preferable that $T_1$ be greater than zero to avoid coincidence of points $X_1$ and $X_2$ with any "rounding off" of the peak at S (i.e., drop-off in Detector respones) due to incident radiation received during charging.

In practice, line SR would be of variable slope, not only because of the non-ideal response of the Detector, but also because it would reflect the changes in intensity of radiation as various blades and parts of blades passed the observation point. It should also be noted that the sensitivity of a diode Detector of the type used in the present invention is a function of cell voltage, but because we utilise fixed measuring points $X_1$ and $X_2$ on the line SR, this affect would be taken out in the initial calibration of the apparatus.

As already noted, by making time $T_v$ variable, any part of any blade on the rotor can be made accessible to measurement within the limits of resolution of the apparatus, and since $\delta t$ is kept constant, $\delta v$ alone will be the measure of the rate of decrease of the charge on Detector 14.

In the above described way it is possible to measure the temperature of individual blades in an engine turbine. The actual blade being measured would be selected by synchronising the pyrometer to pickups or the like on the engine shaft, and the measurement period would be determined by balancing the velocity of the blade against its operating temperature to provide an adequate signal.

Experimental work suggests that for modern turbines at say 900°C, a measurement period of 10 microseconds or less is a feasible proposition, which would allow a blade velocity of 1,500ft/second to be handled, with a "target" area 0.180 inch across, dependent upon optical magnifications and other design considerations. The high the temperature of the object to be measured, the shorter the measurement period may be made. This means that the target area may be made smaller and hence greater resolution of the temperature profile can be obtained.

The output of the Difference Amplifier 22 may be fed to a suitable oscilloscope 25, and if in successive revolutions of the turbine time Tv is cyclically increased and decreased step-by-step within certain limits, points $X_1$ and $X_2$ (FIG. 3 (c)) will be correspondingly moved up and down the time axis, and a complete spanwise temperature profile of the blade may be built up on the screen.

Alternatively, the output of the Amplifier may be fed to a pen recorder 26 or other means of producing a permanent record. Additionally, or alternatively, the output may be made to operate an alarm or a control system 27 in the engine and/or aircraft in which it is fitted when the output rises above a certain level indicative of excessibely high temperatures in the blade or blades under investigation.

It will be understood by the average specialist in the present field of invention that certain refinements can be made to the above described system.

For example, though the above described pyrometer would be adapted to measure only the intensity of radiation at a single wavelength (in order that accurate assessment of blade temperature is possible according to Planck's Law), it would instead be possible to monitor the intensity of two frequencies (using suitable filters and/or photo-sensitive elements) and take their ratio. This would provide a safeguard against reduction in the response of the pyrometer due to dirt and the like sticking to the lenses, since the ratio of the intensity at each frequency would be substantially independent of the drop in radiation getting through to the sensitive element.

Besides the application of our invention to the measurement of temperatures of rotating turbine blades, other applications could be to the measurement of temperature on production lines, heat treatment processes and the like. For low velocity bodies it may be possible to work at 400°–450°C, with integrating periods of 1 or 2 milliseconds.

I claim:

1. A radiation pyrometer adapted to produce an output signal which is proportional to the intensity of incident radiation comprising radiation detector means, detector charging means, and detector potential differentiating means, said detector charging means being adapted to charge said radiation detector means to a predetermined electrical potential at regular time intervals whereby a series of signals is obtained from the radiation detector means in a period of time, said radiation detector means being adapted to produce, upon receipt of said radiation, an electromotive force acting in opposition to said potential, and said differentiating means being adapted to produce a difference signal substantially proportional to the rate of change of said detector potential with respect to time, said difference signal also being the aforementioned output signal.

2. A radiation pyrometer as claimed in claim 1 in which the source of radiation is a rotor.

3. A radiation pyrometer as claimed in claim 2 including a variable delay circuit, said radiation detector means being connected to said variable delay circuit whereby the radiation detector means can be charged at any point in a revolution of the rotor whereby the radiation therefrom can be detected.

4. A radiation pyrometer as claimed in claim 2 in which the rotor is a turbine rotor of a gas turbine engine and the portion of the rotor comprises a turbine blade mounted on the rotor.

5. A radiation pyrometer as claimed in claim 2 in which the detector charging means charges the radiation detector means once per revolution of the rotor whereby the radiation emanating from a portion of the rotor is detected once per revolution of the rotor.

6. A radiation pyrometer as claimed in claim 1 in which the detector charging means comprises means for producing a shaped electrical trigger pulse which is fed to a pulse generator which is adapted to produce a charging pulse for the radiation detector means after reception of the shaped trigger pulse.

7. A radiation pyrometer as claimed in claim 6 in which there is provided at least one delay circuit and at least one detector output sampler, said at least one delay circuit being adapted to connect the radiation detector means output to said at least one sampler at a predetermined time after the radiation detector means has received a charging pulse.

8. A radiation pyrometer as claimed in claim 7 in which there are two delay circuits and two detector output samplers, each sampler being connected to the radiation detector means at different time intervals after the radiation detector means has received a charging pulse.

9. A radiation pyrometer as claimed in claim 8 in which the output signals from the samplers are fed to a difference amplifier which is adapted to produce an output signal proportional to the difference between the sampler output signals.

10. A radiation pyrometer as claimed in claim 9 in which the output signal from the difference amplifier is fed to an oscilloscope whereby a temperature profile of the portion of the rotor is displayed.

11. A radiation pyrometer as claimed in claim 9 in which the output signal from the difference amplifier is fed to recording means such as a pen recorder.

12. A radiation pyrometer as claimed in claim 9 in which the output signal from the difference amplifier is fed to alarm means or temperature control means of the rotor when the output signal exceeds a predetermined value.

* * * * *